(12) United States Patent
Floyd et al.

(10) Patent No.: US 8,751,164 B2
(45) Date of Patent: Jun. 10, 2014

(54) PRODUCTION BY ACTUAL LOSS ALLOCATION

(75) Inventors: Brent A. Floyd, Bellaire, TX (US); Jantina Van Zandwyk, Calgary (CA); Brent Sawatzky, Chestermere (CA); Roberto Barletta, Houston, TX (US); Greg Arnett, Edmonton (CA); Hemant Arora, Houston, TX (US); Yixin Li, Calgary (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 890 days.

(21) Appl. No.: 12/336,740

(22) Filed: Dec. 17, 2008

(65) Prior Publication Data

US 2009/0164126 A1 Jun. 25, 2009

Related U.S. Application Data

(60) Provisional application No. 61/016,393, filed on Dec. 21, 2007.

(51) Int. Cl.
*G01V 1/40* (2006.01)

(52) U.S. Cl.
USPC .......................................................... 702/6

(58) Field of Classification Search
USPC .................................................... 702/6–13
See application file for complete search history.

(56) References Cited

U.S. PATENT DOCUMENTS

| 5,992,519 | A  | 11/1999 | Ramakrishnan et al. |
| 6,313,837 | B1 | 11/2001 | Assa et al. |
| 7,248,259 | B2 | 7/2007  | Fremming et al. |
| 7,434,619 | B2 | 10/2008 | Rossi et al. |
| 7,660,711 | B2 * | 2/2010 | Pita et al. ........................ 703/10 |
| 2003/0216897 | A1 | 11/2003 | Endres et al. |
| 2005/0149307 | A1 | 7/2005  | Gurpinar et al. |
| 2008/0103743 | A1 | 5/2008  | Howell et al. |
| 2008/0133194 | A1 | 6/2008  | Klumpen et al. |

FOREIGN PATENT DOCUMENTS

| GB | 2459404 A     | 10/2009 |
| GB | 2462974 A     | 3/2010  |
| WO | 9964896 A1    | 12/1999 |
| WO | 2004049216 A1 | 6/2004  |
| WO | 2007089829 A2 | 8/2007  |
| WO | WO2009075962 A2 | 6/2009 |

OTHER PUBLICATIONS

Tarmoom, et al., "Efficient Management of Production Losses to Increase Production", SPE 100754—International Petroleum Exhibition and Conference, Abu Dhabi, Nov. 5-8, 2006, pp. 1-6.

* cited by examiner

*Primary Examiner* — Stephen Cherry
(74) *Attorney, Agent, or Firm* — Colin L. Wier; Rodney Warfford; Alec J. McGinn (57) ABSTRACT

A method for allocating actual production loss of a wellsite. The method includes defining a data collection procedure and capturing production data according to the data collection procedure, the production data including actual production data and a maximum production potential of the wellsite. The method further includes selectively allocating a portion of the actual production data to the wellsite based on allocation rules to obtain derived production data, comparing the derived production data to the maximum production potential to determine the actual production loss for the wellsite, allocating the actual production loss to at least one of the production events, and determining a cause of the actual production loss based on an engineering analysis of the production events.

9 Claims, 9 Drawing Sheets

PRODUCTION BY ACTUAL LOSS ALLOCATION

CROSS-REFERENCE TO RELATED APPLICATION

This application claims priority, pursuant to 35 U.S.C. §119(e), to the filing date of U.S. Patent Application Ser. No. 61/016,393, entitled "System and Method for Performing Oilfield Production Operations," filed on Dec. 21, 2007, which is hereby incorporated by reference in its entirety.

BACKGROUND

Operations, such as surveying, drilling, wireline testing, completions, production, planning and field analysis, are typically performed to locate and gather valuable downhole fluids. Surveys are often performed using acquisition methodologies, such as seismic scanners or surveyors to generate maps of underground formations. These formations are often analyzed to determine the presence of subterranean assets, such as valuable fluids or minerals, or to determine if the formations have characteristics suitable for storing fluids.

During drilling and production operations, data is typically collected for analysis and/or monitoring of the operations. Such data may include, for instance, information regarding subterranean formations, equipment, and historical and/or other data.

Data concerning the subterranean formation is collected using a variety of sources. Such formation data may be static or dynamic. Static data relates to, for instance, formation structure and geological stratigraphy that define geological structures of the subterranean formation. Dynamic data relates to, for instance, fluids flowing through the geologic structures of the subterranean formation over time. Such static and/or dynamic data may be collected to learn more about the formations and the valuable assets contained therein.

Various equipment may be positioned about the field to monitor field parameters, to manipulate the operations and/or to separate and direct fluids from the wells. Surface equipment and completion equipment may also be used to inject fluids into reservoirs, either for storage or at strategic points to enhance production of the reservoir.

SUMMARY

In one or more implementations of allocating actual production loss of a wellsite, the method includes defining a data collection procedure and capturing production data according to the data collection procedure, the production data including actual production data and a maximum production potential of the wellsite. The method further includes selectively allocating a portion of the actual production data to the wellsite based on allocation rules to obtain derived production data, comparing the derived production data to the maximum production potential to determine the actual production loss for the wellsite, allocating the actual production loss to at least one of the production events, and determining a cause of the actual production loss based on an engineering analysis of the production events Other aspects of improving production by actual loss allocation will be apparent from the following description and the appended claims.

BRIEF DESCRIPTION OF DRAWINGS

So that the above described features and advantages of subterranean formation properties prediction can be understood in detail, a more particular description of subterranean formation properties prediction, briefly summarized above, may be had by reference to the embodiments thereof that are illustrated in the appended drawings. It is to be noted, however, that the appended drawings illustrate only typical embodiments and are therefore not to be considered limiting of its scope, for subterranean formation properties prediction may admit to other equally effective embodiments.

FIGS. 7.1-7.2 show schematic diagrams of one or more embodiments of the data management tool of FIG. 6.

DETAILED DESCRIPTION

Presently embodiments of improving production by actual loss allocation are shown in the above-identified figures and described in detail below. In describing the embodiments, like or identical reference numerals are used to identify common or similar elements. The figures are not necessarily to scale and certain features and certain views of the figures may be shown exaggerated in scale or in schematic in the interest of clarity and conciseness.

Figure 1:
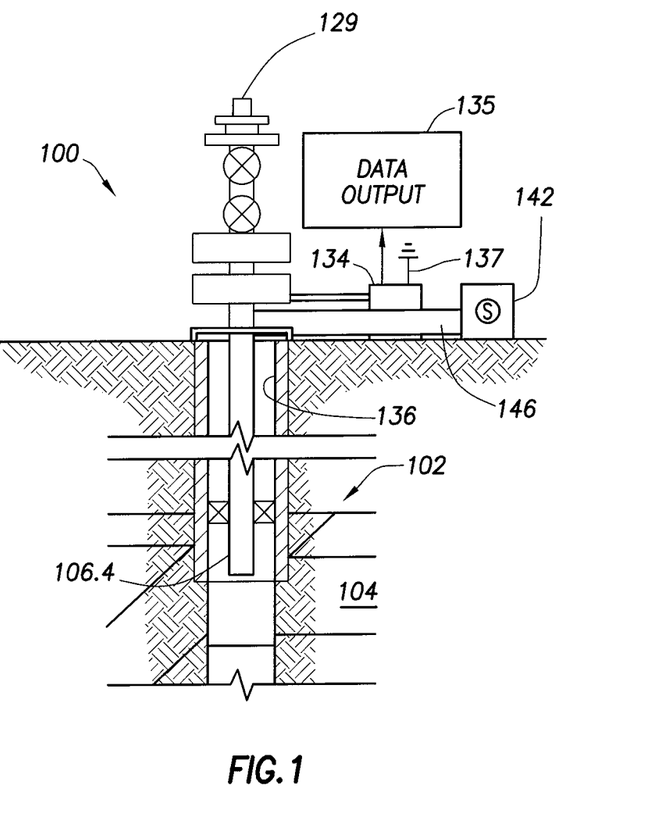
FIG. 1 depicts a simplified, schematic view of a field having subterranean formations containing reservoirs therein, the various operations being performed on the field.

FIG. 1 depicts a simplified, representative, schematic view of a field 100 having subterranean formation 102 containing reservoir 104 therein and depicting a production operation being performed on the field 100. More specifically, FIG. 1 depicts a production operation being performed by a production tool 106.4 deployed from a production unit or Christmas tree 129 and into a completed wellbore 136 for drawing fluid from the downhole reservoirs into the surface facilities 142. Fluid flows from reservoir 104 through perforations in the casing (not shown) and into the production tool 106.4 in the wellbore 136 and to the surface facilities 142 via a gathering network 146.

Sensors (S), such as gauges, may be positioned about the field to collect data relating to various field operations as described previously The data gathered by the sensors (S) may be collected by the surface unit 134 and/or other data collection sources for analysis or other processing. The data collected by the sensors (S) may be used alone or in combination with other data. The data may be collected in one or more databases and/or all or transmitted on or offsite. All or select portions of the data may be selectively used for analyzing and/or predicting operations of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

Data outputs from the various sensors (S) positioned about the field may be processed for use. The data may be historical data, real time data, or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For instance, the seismic data output may be used to perform geological, geophysical, and/or reservoir engineering. The reservoir, wellbore, surface and/or process data may be used to perform reservoir, wellbore, geological, geophysical or other simulations. The data outputs from the operation may be generated directly from the sensors (S), or after some preprocessing or modeling. These data outputs may act as inputs for further analysis.

The data is collected and stored at the surface unit 134. One or more surface units 134 may be located at the field 100, or connected remotely thereto. The surface unit 134 may be a single unit, or a complex network of units used to perform the necessary data management functions throughout the field 100. The surface unit 134 may be a manual or automatic system. The surface unit 134 may be operated and/or adjusted by a user.

The surface unit 134 may be provided with a transceiver 137 to allow communications between the surface unit 134 and various portions of the field 100 or other locations. The surface unit 134 may also be provided with or functionally connected to one or more controllers for actuating mechanisms at the field 100. The surface unit 134 may then send command signals to the field 100 in response to data received. The surface unit 134 may receive commands via the transceiver or may itself execute commands to the controller. A processor may be provided to analyze the data (locally or remotely) and make the decisions and/or actuate the controller. In this manner, the field 100 may be selectively adjusted based on the data collected. This technique may be used to optimize portions of the operation, such as controlling wellhead pressure, choke size or other operating parameters. These adjustments may be made automatically based on computer protocol, and/or manually by an operator. In some cases, well plans may be adjusted to select optimum operating conditions, or to avoid problems.

As shown, the sensor (S) may be positioned in the production tool 106.4 or associated equipment, such as the Christmas tree, gathering network, surface facilities and/or the production facility, to measure fluid parameters, such as fluid composition, flow rates, pressures, temperatures, and/or other parameters of the production operation.

While FIG. 1 depicts tools used to measure properties of a field 100, it will be appreciated that the tools may be used in connection with non-wellsite operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configuration in FIG. 1 is intended to provide a brief description of a field usable for improving production by actual loss allocation. Part, or all, of the field 100 may be on land, sea and/or water. Production may also include injection wells (not shown) for added recovery. One or more gathering facilities may be operatively connected to one or more of the wellsites for selectively collecting downhole fluids from the wellsite(s). Also, while a single field measured at a single location is depicted, improving production by actual loss allocation may be utilized with any combination of one or more fields 100, one or more processing facilities and one or more wellsites.

Figure 2:
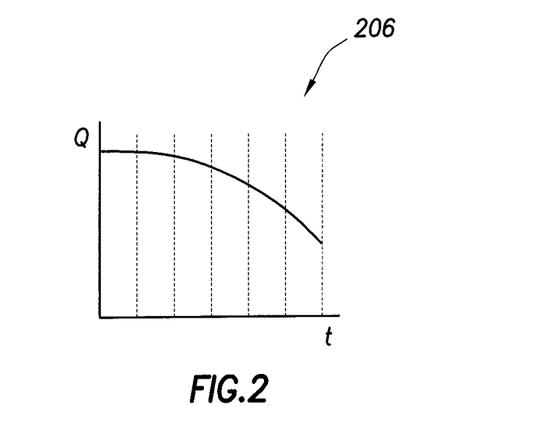
FIG. 2 is a graphical depiction of data collected by the tools of FIG. 1.

FIG. 2 is a graphical depiction of data collected by the tools of FIG. 1. FIG. 2 depicts a production decline curve or graph 206 of fluid flowing through the subterranean formation of FIG. 1 measured at the surface facilities 142. The production decline curve 206 typically provides the production rate (Q) as a function of time (t).

The respective graphs of FIG. 2 depict static measurements that may describe information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

FIG. 2 depicts a dynamic measurement of the fluid properties through the wellbore. As the fluid flows through the wellbore, measurements are taken of fluid properties, such as flow rates, pressures, composition, etc. As described below, the static and dynamic measurements may be analyzed and used to generate models of the subterranean formation to determine characteristics thereof. Similar measurements may also be used to measure changes in formation aspects over time.

Figure 3:
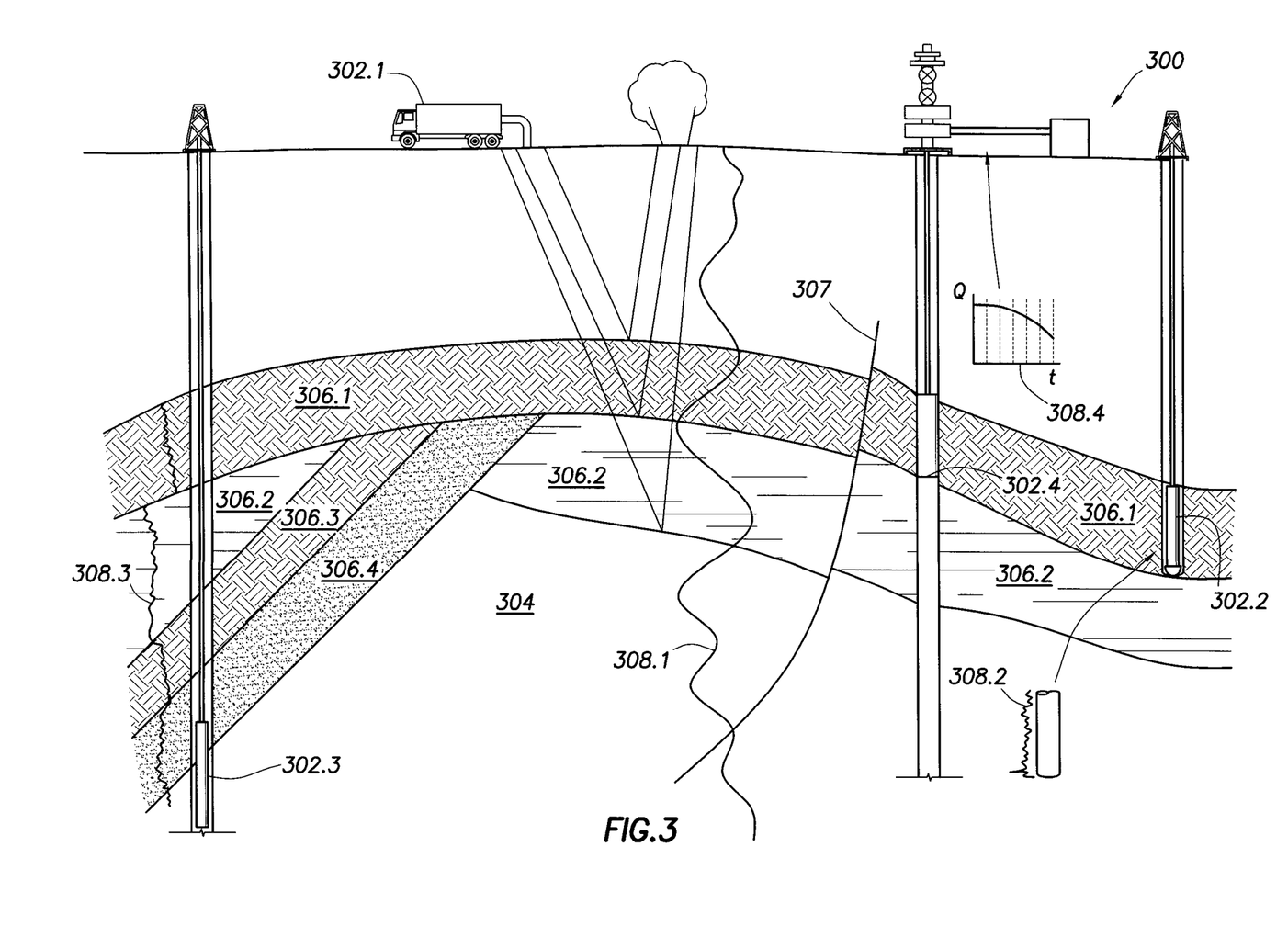
FIG. 3 is a schematic view, partially in cross section of a field having a plurality of data acquisition tools positioned at various locations along the field for collecting data from the subterranean formations.

FIG. 3 is a schematic view, partially in cross section of a field 300 having data acquisition tools 302.1, 302.2, 302.3, and 302.4 positioned at various locations along the field for collecting data of a subterranean formation 304. The data acquisition tool 302.4 may be the same as data acquisition tool (106.4 of FIG. 1), respectively, or others not depicted. As shown, the data acquisition tools 302.1-302.4 generate data plots or measurements (308.1-308.4), respectively. These data plots are depicted along the field to demonstrate the data generated by various operations.

Data plots 308.1-308.3 are static data plots that may be generated by the data acquisition tools 302.1-302.4, respectively. Static data plot 308.1 is a seismic two-way response time. Static plot 308.2 is core sample data measured from a core sample of the formation 304. Static data plot 308.3 is a logging trace. Production decline curve or graph 308.4 is a dynamic data plot of the fluid flow rate over time, similar to the graph 206 of FIG. 2. Other data may also be collected, such as historical data, user inputs, economic information, and/or other measurement data and other parameters of interest.

The subterranean formation 304 has a plurality of geological formations 306.1-306.4. As shown, the structure has several formations or layers, including a shale layer 306.1, a carbonate layer 306.2, a shale layer 306.3 and a sand layer 306.4. A fault line 307 extends through the layers 306.1-306.2. The static data acquisition tools are adapted to take measurements and detect the characteristics of the formations.

While a specific subterranean formation 304 with specific geological structures are depicted, it will be appreciated that the field may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in the field, it will be appreciated that one or more types of measurement may be taken at one or more location across one or more fields or other locations for comparison and/or analysis.

The data collected from various sources, such as the data acquisition tools of FIG. 3, may then be processed and/or evaluated. Typically, seismic data displayed in the static data plot 308.1 from the data acquisition tool 302.1 is used by a geophysicist to determine characteristics of the subterranean formations 304 and features. Core data shown in static plot 308.2 and/or log data from the well log 308.3 is typically used by a geologist to determine various characteristics of the subterranean formation 304. Production data from the graph 308.4 is typically used by the reservoir engineer to determine fluid flow reservoir characteristics. The data analyzed by the geologist, geophysicist and the reservoir engineer may be analyzed using modeling techniques. Modeling techniques are described in Application/Publication/U.S. Pat. No. 5,992, 519, WO2004/049216, WO1999/064896, U.S. Pat. No. 6,313,837, US2003/0216897, U.S. Pat. No. 7,248,259, US2005/0149307 and US2006/0197759. Systems for performing such modeling techniques are described, for instance, in U.S. Pat. No. 7,248,259, the entire contents of which is hereby incorporated by reference.

Figure 4:
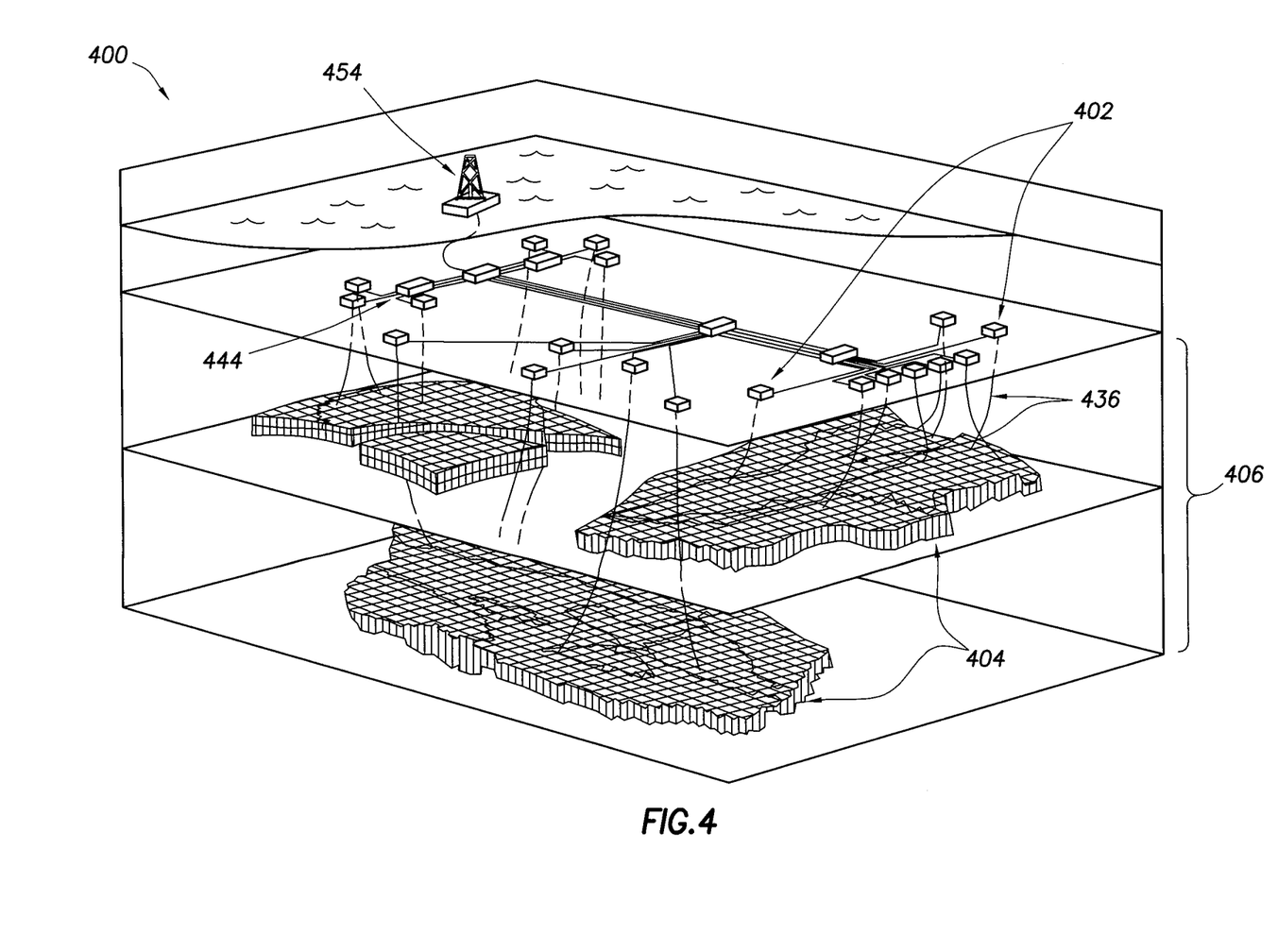
FIG. 4 shows a schematic view of a field having a plurality of wellsites for producing fluids from the subterranean formation.

FIG. 4 shows a field 400 for performing production operations. As shown, the field has a plurality of wellsites 402 operatively connected to a central processing facility 454. The field configuration of FIG. 4 is not intended to limit improving production by actual loss allocation. Part or all of the field may be on land and/or sea. Also, while a single field with a single processing facility and a plurality of wellsites is depicted, any combination of one or more fields, one or more processing facilities and one or more wellsites may be present.

Each wellsite 402 has equipment that forms a wellbore 436 into the earth. The wellbores extend through subterranean formations 406 including reservoirs 404. These reservoirs 404 contain fluids, such as hydrocarbons. The wellsites draw fluid from the reservoirs and pass them to the processing facilities via surface networks 444. The surface networks 444 have tubing and control mechanisms for controlling the flow of fluids from the wellsite to the processing facility 454.

Figure 5:
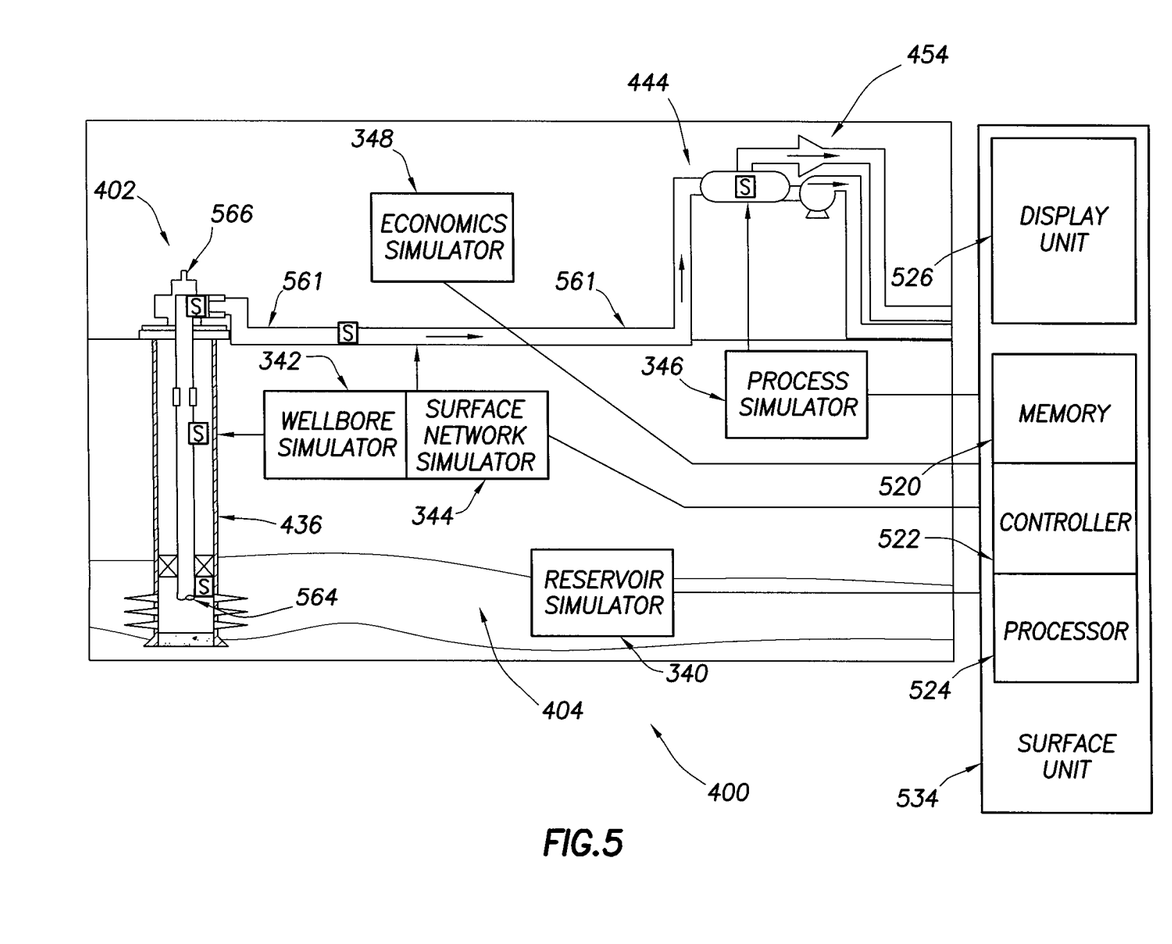
FIG. 5 shows a schematic diagram of a portion of the field of FIG. 4 depicting a simulation operation.

FIG. 5 shows a schematic view of a portion (or region) of the field 400 of FIG. 4, depicting a producing wellsite 402 and surface network 444 in detail. The wellsite 402 of FIG. 5 has a wellbore 436 extending into the earth therebelow. As shown, the wellbores 436 has already been drilled, completed, and prepared for production from reservoir 404.

Wellbore production equipment 564 extends from a wellhead 566 of wellsite 402 and to the reservoir 404 to draw fluid to the surface. The wellsite 402 is operatively connected to the surface network 444 via a transport line 561. Fluid flows from the reservoir 404, through the wellbore 436, and onto the surface network 444. The fluid then flows from the surface network 444 to the process facilities 454.

As further shown in FIG. 5, sensors (S) are located about the field 400 to monitor various parameters during operations. The sensors (S) may measure, for instance, pressure, temperature, flow rate, composition, and other parameters of the reservoir, wellbore, surface network, process facilities and/or other portions (or regions) of the operation. These sensors (S) are operatively connected to a surface unit 534 for collecting data therefrom. The surface unit may be, for instance, similar to the surface unit 134 of FIG. 1.

One or more surface units 534 may be located at the field 400, or linked remotely thereto. The surface unit 534 may be a single unit, or a complex network of units used to perform the necessary data management functions throughout the field 400. The surface unit may be a manual or automatic system. The surface unit may be operated and/or adjusted by a user. The surface unit is adapted to receive and store data. The surface unit may also be equipped to communicate with various field equipment. The surface unit may then send command signals to the field in response to data received or modeling performed.

As shown in FIG. 5, the surface unit 534 has computer facilities, such as memory 520, controller 522, processor 524, and display unit 526, for managing the data. The data is collected in memory 520, and processed by the processor 524 for analysis. Data may be collected from the field sensors (S) and/or by other sources. For instance, production data may be supplemented by historical data collected from other operations, or user inputs.

The analyzed data (e.g., based on modeling performed) may then be used to make decisions. A transceiver (not shown) may be provided to allow communications between the surface unit 534 and the field 400. The controller 522 may be used to actuate mechanisms at the field 400 via the transceiver and based on these decisions. In this manner, the field 400 may be selectively adjusted based on the data collected. These adjustments may be made automatically based on computer protocol and/or manually by an operator. In some cases, well plans are adjusted to select optimum operating conditions or to avoid problems.

To facilitate the processing and analysis of data, simulators may be used to process the data for modeling various aspects of the operation. Specific simulators are often used in connection with specific operations, such as reservoir or wellbore simulation. Data fed into the simulator(s) may be historical data, real time data or combinations thereof. Simulation through one or more of the simulators nay be repeated or adjusted based on the data received.

As shown, the operation is provided with wellsite and non-wellsite simulators. The wellsite simulators may include a reservoir simulator 340, a wellbore simulator 342, and a surface network simulator 344. The reservoir simulator 340 solves for hydrocarbon flow through the reservoir rock and into the wellbores. The wellbore simulator 342 and surface network simulator 344 solves for hydrocarbon flow through the wellbore and the surface network 444 of pipelines. As shown, some of the simulators may be separate or combined, depending on the available systems.

The non-wellsite simulators may include process 346 and economics 348 simulators. The processing unit has a process simulator 346. The process simulator 346 models the processing plant (e.g., the process facilities 454) where the hydrocarbon(s) is/are separated into its constituent components (e.g., methane, ethane, propane, etc.) and prepared for sales. The field 400 is provided with an economics simulator 348. The economics simulator 348 models the costs of part or the entire field 400 throughout a portion or the entire duration of the operation. Various combinations of these and other field simulators may be provided.

Figure 6:
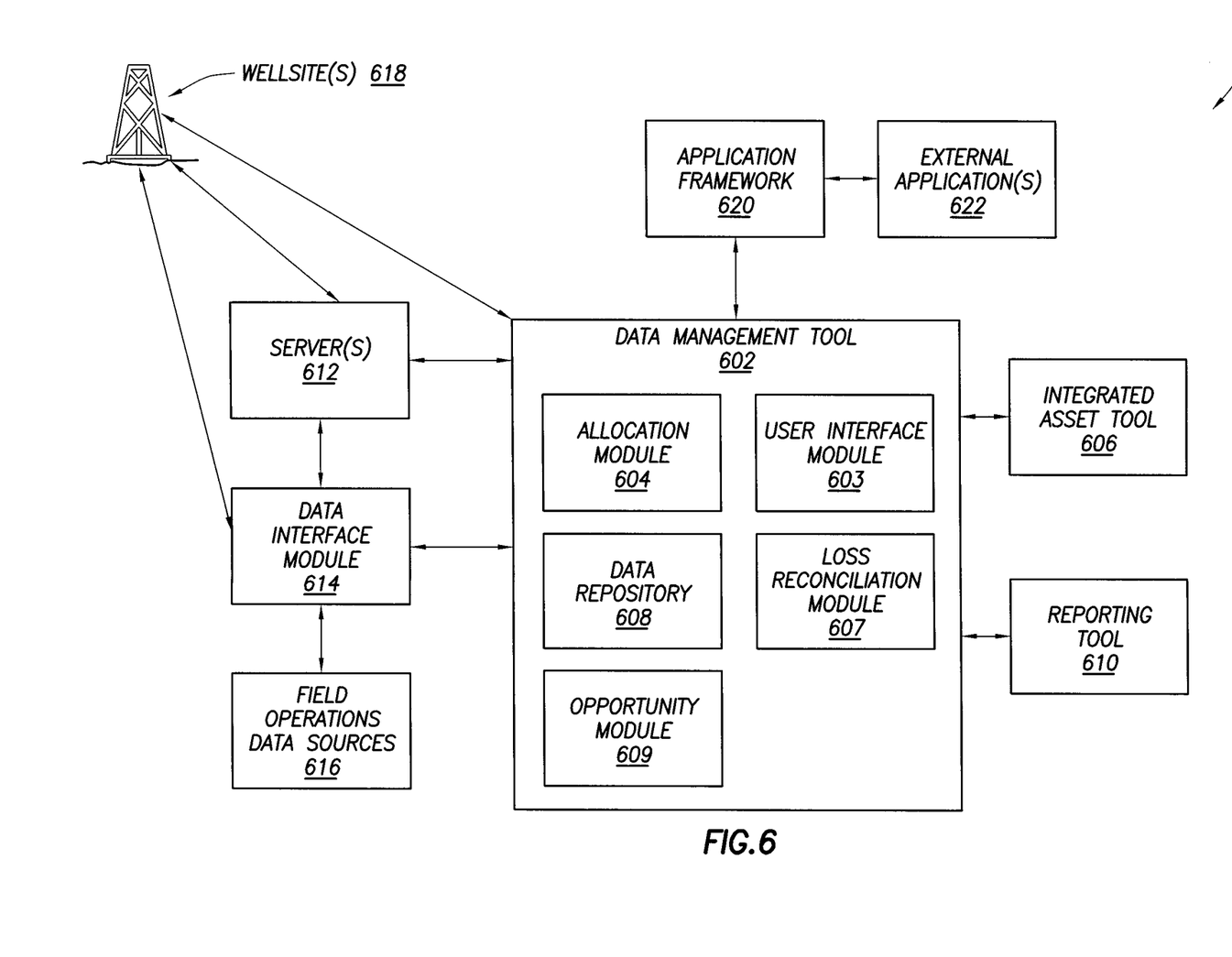
FIG. 6 shows a schematic diagram of one or more embodiments of a system for performing a production operation using a data management tool.

FIG. 6 is a schematic view of a system 600 for performing a production operation. As shown, the system 600 includes a data management tool 602 operatively connected to one or more servers 612, a data interface module 614, an application framework 620, and integrated asset tool 606, and a reporting tool 610.

The server(s) 612 may be used to transfer data from one or more wellsite(s) 618 to the data management tool 602. The server(s) 612 may include onsite servers, a remote server, and/or a third-party server. An onsite server may be positioned at the wellsite and/or other adjacent locations for distributing data from a surface unit. The surface unit may be the same surface unit as shown and described in relation to FIGS. 1 and 5. The remote server is positioned at a location away from the field and provides data from remote sources. The third-party server may be onsite or remote, but is operated by a third-party, such as a customer/client. In some cases, the data management tool 602 may communicate data to the surface unit for adjusting an operation of the wellsite.

The wellsite(s) 618 may provide data measured by the sensors (S) of the wellsite as described with respect to FIG. 1. This data may also be data received from other sources at the wellsite. The data may also be stored on a computer readable medium such as a compact disk, DVD, optical media, volatile storage, non-volatile storage, or any other medium configured to store the data.

The server(s) 612 are capable of transferring operations data (e.g., logs), production data, measurements, and/or other field data (e.g., seismic data, historical data, economics data, or other data that may be of use during analysis). The type of server is not intended to limit the system 600. The system 600 is adapted to function with any type of server or computer system that may be employed.

The server(s) 612 collect a wide variety of data. The data may be collected from a variety of channels that provide a certain type of data, such as well logs. The data from the server(s) 612 is passed to the data management tool 602 for processing. The server(s) 612 may also be used to store and/or transfer data.

In some cases, the data management tool 602 and/or server(s) 612 may be positioned at the wellsite. The data management tool 602 and/or server(s) 612 may also be positioned at various locations. The data management tool 602 may be operatively linked to the surface unit via the server(s) 612. The data management tool 602 may also be included in or located near the surface unit.

The data management tool 602 includes one or more of the following modules: an allocation module 604, a loss reconciliation module 607, a data repository 608, a user interface module 603, and an opportunity module.

The data management tool 602 may use the data interface module 614 to communicate with other components, such as the server(s) 612. The data interface module 614 may also permit communication with other field or non-field sources.

As depicted in FIG. 6, the data interface module 614 selects the data channel of the server(s) 612 and receives the data. The data interface module 614 also maps the data channels to data from the wellsite(s) 618. The data interface module 614 may also receive data from a data file (i.e., an extensible markup language (XML) file, a database file, a comma separated file (CSV), or some other data file format). The data may then be passed to the data management tool 602. The data may be immediately incorporated into the data repository 608 for real-time sessions or modeling.

In some cases, the data interface module 614 may receive data from field operations data sources 616. Field operations data sources 616 may include data collected by field operators while at a site (e.g., wellsite, facility, etc.). For instance, field operators may collect field data using mobile devices where the data is then imported into the data management tool 602 using the data interface module 614. In some cases the server(s) 612, the data interface module 614, and the field operations data source(s) 616 may be referred to as data acquisition tools.

The user interface module 603 creates data requests (e.g., pressure, temperature, volume, etc.), displays the user interface, and handles connection state events. The user interface module 603 also instantiates the data into a data object for processing. The user interface module 603 may receive a request at the surface unit to retrieve data from the server(s) 612, the well unit, and/or data files. The user interface module 603 may allow a user to select a plurality of parameters to be used in a data acquisition model. The parameters of the data acquisition model may describe field data to be retrieved from the server(s) 612 and/or the wellsite(s) 618. More specifically, the parameters may correspond to daily measurements (e.g., pressure, temperature, volume, etc.) obtained from the wellsite(s) 618.

In some cases, the user interface module 603 may also provide functionality to define a unit system in the data acquisition model. For instance, the data acquisition model may include custom unit systems based on industry standard conversions for metric and imperial units. Further, the user interface module 603 may allow users to customize preferences for unit conversions.

The user interface module 603 may also allow a user to define a data collection procedure for the data acquisition model. For instance, the data collection procedure may define connections between wellsites, facilities, and/or operation's equipment. The data collection may also define: validation rules for field data retrieved from the server(s) 612; field models for wellsites, facilities, and/or equipment (e.g., define meters, define documentation requirements, define well estimation method, etc.); an allocation network model; and/or various other user-defined configurations. In some cases, the data collection procedure may include a schedule for executing automated field data (e.g., Supervisory Control And Data Acquisition (SCADA) data, data historian data, DECIDE! Data, etc.) collection activities to capture and load data into the operation data store including intraday data.

In some cases, the data collection procedure may be customized to allow the capture of intraday data. For instance, a user may specify that the data collection procedure collect intraday data based on a schedule or on demand as required by the user. The user may configure the data collection procedure to collect data on a daily basis or an intraday basis based on the requirements of the wellsite. For instance, the user may configure the data collection procedure to collect intraday data for a period of time after a significant occurrence in the operation of a field (e.g., drastic change in production, pressure, etc.). Further, the user may then configure the data collection procedure to collect data on a daily basis after the significant occurrence has been addressed.

Intraday data may be aggregated by a user-selected rule to a daily value (e.g., the last value entered, the first value entered, an average of the values entered, etc.). Production data may have associated intraday values. Further, intraday values can be captured for sites and equipment (e.g., meters, tanks, etc.) on standard variables, user-defined data points, and custom entity variables. In some cases, users may select and edit multiple intraday variables for viewing simultaneously. In addition, users may also enter intraday text fields to capture well states during the day.

In some cases, the user interface module 603 may provide functionality to create specialized meters to be used in a data collection procedure. For instance, these specialized meters can record the measurement of multiphase, wet gas and unstabilized emulsions using pressure differential, direct volumetric, and mass instruments. In this example, the results obtained from the advanced meter may be a dry gas volume, an oil volume, a condensate volume, or a water volume. Further, the user interface module 603 may include functionality for all users to create custom calculations across wellsites using either the graphical derived meter expression builder or link a custom computation procedures (e.g., a PL/SQL or a C++, C# procedure) to extend the meter calculations. Derived meters may output volume or mass and may utilize user defined variables in their calculations.

The user interface module 603 may also allow the user to configure and manage users within the data management tool 602. More specifically, the user interface module 603 may provide functionality to define user roles, assign system rights, and assign users to each role. For instance, a user may be associated with a corporate network (e.g., Active Directory, Lightweight Directory Access Protocol LDAP service, etc.) for user validation and/or authentication. In another example, the data management tool may be configured to log off inactive users automatically for improved security and management of concurrent licenses.

In some cases, the user interface module 603 may also provide functionally to define a user role's access to the reporting tool 610. For instance, a user may be allowed to run reports but prevented from modifying reports. In another example, a user may be allowed to modify reports created by the user; however, the user's access to reports created by other users would be restricted. In another example, public reports may be provided that are accessible to all users but can only be modified by an administrator.

The data repository 608 may store the data for the data management tool 602. For instance, the user interface module 603 may be configured to store data related to the data acquisition model and/or the data collection procedure in the data repository 608. The data may be stored in a format available for use in real-time (e.g., information is updated at approximately the same rate the information is received). The data may be persisted in the file system (e.g., an XML file) or in a database. The system 600 may determine which storage is the most appropriate to use for a given piece of data and store the data in a manner to enable automatic flow of the data through the rest of the system in an automated and integrated fashion. The system 600 may also facilitate manual and automated workflows (e.g., Modeling, Production Operations and Allocation workflows, etc.) based upon the persisted data.

The user interface module 603 may provide functionality for capturing the production data in the data acquisition model based on the data collection procedure. More specifically, the user interface module 603 may be configured to retrieve production data as defined in parameters of the data acquisition model based on rules defined in the data collection procedure. For instance, the user interface module 603 may obtain actual production data from server(s) 612 using a connection defined in the data collection procedure. The actual production data may be the recorded production of a wellsite or field during a production period. Further, the actual production data may be obtained from the server(s) 612 based on a schedule (e.g., daily, weekly, monthly, quarterly, etc.) defined by the user. In another example, the user interface module 603 may be configured to receive production data manually entered by a user as parameters defined in the data acquisition model.

In some cases, the data management tool 602 may be configured to interact with external application(s) 622 to obtain production data manually entered by a user. For instance, the data management tool 602 may include an application framework 620 accessible by external application(s) 622. Further, in some cases, the application framework 620 may also be configured to interact with a variety of external field applications (e.g., PIPESIM module, HYSYS module, simulation modules, production modules, etc.).

The user interface module 603 may be configured to collect multiple sets of data based on a number of data collection procedures. For instance, the user interface module 603 may be configured to collect actual production data based on a production data collection procedure and ownership data based on an ownership data collection procedure.

Continuing with the discussion of FIG. 6, the user interface module 603 may be further configured to obtain events associated with a wellsite during a production period. The events may be automatically recorded and stored in the server(s) 612 during the production period. More specifically, field data associated with an unexpected alteration may be tracked into order to obtain events for a wellsite. In another example, a user may manually enter the events associated with a wellsite using the user interface module 603. An event may be a significant occurrence in the operation of a field. Examples of significant occurrences include, but are not limited to: changes in the level of production, providing a measurement (e.g., pressure, temperature, volume, etc.), or a confirmed difficulty in the operation of the field (e.g., power outage, force of nature, mechanical failure, etc.). In another example, an event may be an occurrence that unexpectedly alters measurements associated with a component of the wellsite.

The integrated asset tool 606 may be configured to generate an integrated asset model based on the production data. The integrated asset model may selectively link components (e.g., wellbore, reservoir, gathering facility, processing facility) of a wellsite. For instance, the integrated asset model may model the various components of a wellsite such that choke points (e.g., reservoir, wellbore, surface network, process facility, government regulator, product market, etc.) may be identified at the wellsite. In this example, a wellsite's maximum production potential may be determined based on the choke points identified at the wellsite. In some cases, the integrated asset tool 606 may include simulators as described in FIG. 5. Systems for performing such simulation techniques are described, for instance, in U.S. patent application Ser. No. 11/929,811, the entire contents of which is hereby incorporated by reference. The simulators may be configured to perform simulations using the field data collected by the user interface module 603.

The allocation module 604 may provide functionality to determine the estimated production of a wellsite during a production period. For instance, a wellsite's estimated production may be determined based on well tests and measured flowing tubing pressure. In another example, the estimated production for the field may be determined based on actual field measurements. The allocation module 604 may further be configured to allocate actual production data to a wellsite based on the wellsite's estimated production. For instance, a portion of actual production data of a field may be allocated to a wellsite based on the proportion of the wellsite's estimated production as compared to the field's estimated production. The allocation module may proportion the production or injection by liquids or gases in totality or by components and as mass, energy, or volume units. Further, the estimated proportion of wellsites of a field may be adjusted for other sources (e.g., gas injection, load oil, etc.) and other uses (e.g., flare, lease use, etc.). The actual production data allocated to a wellsite may be referred to as the wellsite's derived production.

The allocation module 604 may also provide a network visualization tool. The network visualization tool displays all the sites within a selected allocation network and all connections between sites within the regions for the current application date. The allocation network may define procedures for allocating actual product data to wellsites of a field. Further, the network visualization tool may allow users to add connections to the allocation network. In response to modifications of the wellsite, the allocation network may be automatically updated such that daily allocations utilize the most current field setup and configuration data as the basis for daily and monthly allocations.

In some cases, the allocation module 604 may be external to the data management tool. For instance, the data management tool may interact with an external allocation tool to estimate production of the wellsite during a production period.

The loss reconciliation module 607 provides functionality to calculate the actual production loss at a wellsite. More specifically, the actual production loss may be calculated as the difference between the maximum production potential and the actual production determined by the allocation module 604. The loss reconciliation module 607 may be further configured to allocate the actual production loss to events defined by the user interface module 603 during the production period.

The opportunity module 609 provides functionality to generate action plans based on production data associated with a wellsite. More specifically, the opportunity module may be configured to generate an action plan based on the actual production loss allocated to events of the wellsite. In this case, the opportunity module may perform a cost-benefit analysis for improving the production of the wellsite using the action plan. The action plan may also include implementation actions for implementing the action plan at the wellsite.

The reporting tool 610 may be configured to present (e.g., display, store, etc.) production data associated with a wellsite as output. More specifically, the reporting tool 610 may be configured to present the allocation of actual production data to wellsites in a field. The reporting tool 610 may further be configured to present the allocation of actual production losses to the events of a wellsite. In this case, the reporting tool 610 may include historic loss data to be compared to the allocation of the actual production loss. Historic loss data may include causes of the actual production loss categorized in the events of the wellsite. For instance, when a cause of an actual production loss is analyzed, the cause may be stored as historic loss data.

The reporting tool 610 may be configured to use custom or third-party reporting tools (e.g., CRYSTAL REPORTS®, SQL SERVER® Reporting Services, etc.) and/or to present output in a variety of formats (e.g., spreadsheets from spreadsheet applications such as EXCEL® or LOTUS 1-2-3®, ad hoc reporting, third-party reporting formats such as portable document format or hypertext markup language, etc.). Further, the reporting tool 610 may be configured to accept a variety of user configurations (e.g., type of report, target wellsites, date range for the report, recipients of the report, etc.) for a report. CRYSTAL REPORTS® is a registered trademark of Business Objects in San Jose, Calif. SQL SERVER® is a registered trademark of Microsoft, Inc. in Redmond, Wash. EXCEL® is a registered trademark of Microsoft, Inc. in Redmond, Wash. LOTUS 1-2-3® is a registered trademark of Lotus Software in Westford, Mass.

The reporting tool 610 may provide functionality to link a number of reports to run consecutively. In addition, the reporting tool 610 may provide an application framework that allows reports to be scheduled by external applications.

Figure 71:
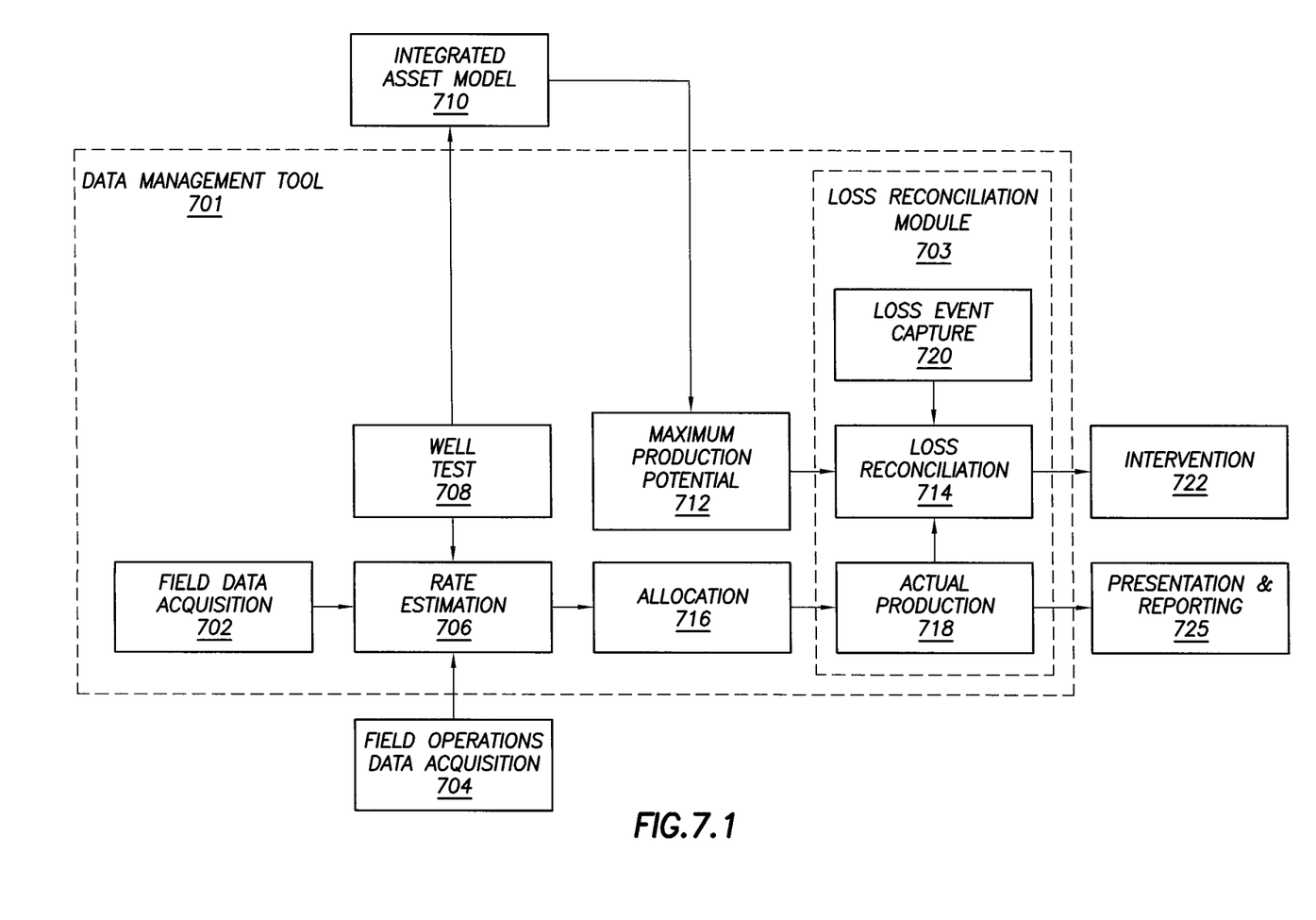

FIG. 7.1 is a schematic view of a field application for performing an operation in one or more embodiments of the invention. As shown, the schematic view depicts portions of the workflow as being performed by the data management tool 701. The data management tool 701 may provide substantially the same functionality as the data management tool 602 of FIG. 6. Further, as shown, the schematic view depicts portions of the workflow as being performed by a loss reconciliation module 703. The loss reconciliation module 703 may provide substantially the same functionality as the loss reconciliation module 607 of FIG. 6.

Data may be acquired from a variety of sources. More specifically, field data acquisition may occur (block 702). Further, field operations data acquisition may occur (block 704). A well test may then be performed using a portion of the acquired data, flowing tubing pressure, to determine an estimated production of a wellsite (block 706).

Next, a portion of the acquired data, actual production data, may be allocated to the wellsite (block 716) based on the estimated production of the wellsite to determine the actual production of the wellsite (block 718).

A well test may also be performed to generate an integrated asset model based a portion of the acquired data (block 710). The integrated asset model may define a number of choke points of the field. Based on these choke points, a maximum production potential may be determined (block 712).

The actual production loss of the wellsite may be determined by comparing the maximum production potential to the actual production of the wellsite. Loss events may be captured from the wellsite (block 720). Typically, a loss event is a significant occurrence (e.g., mechanical failure, force of nature, etc.) at the well site.

At this stage, the actual production loss of the wellsite may be reconciled to the events based on the duration, the production, and the flow rate impact percentage of each of the events (block 714). Optionally, the reconciled loss may be overwritten for a measured loss or an estimated loss based on experience or an observation. In this case, based on the maximum production potential, the actual production losses may be prorated for a group of wells impacted by a singular event based on the total loss reconciled to the event. After reconciling the loss, a user may intervene to specify a cause of the actual production loss based on the loss reconciliation (block 722). Next, the loss reconciliation data may be presented as output.

The method in FIG. 7.1 are depicted in a specific order as may be the case in one or more embodiments. However, it will be appreciated that portions of the method may be performed simultaneously or in a different order or sequence.

Figure 72:
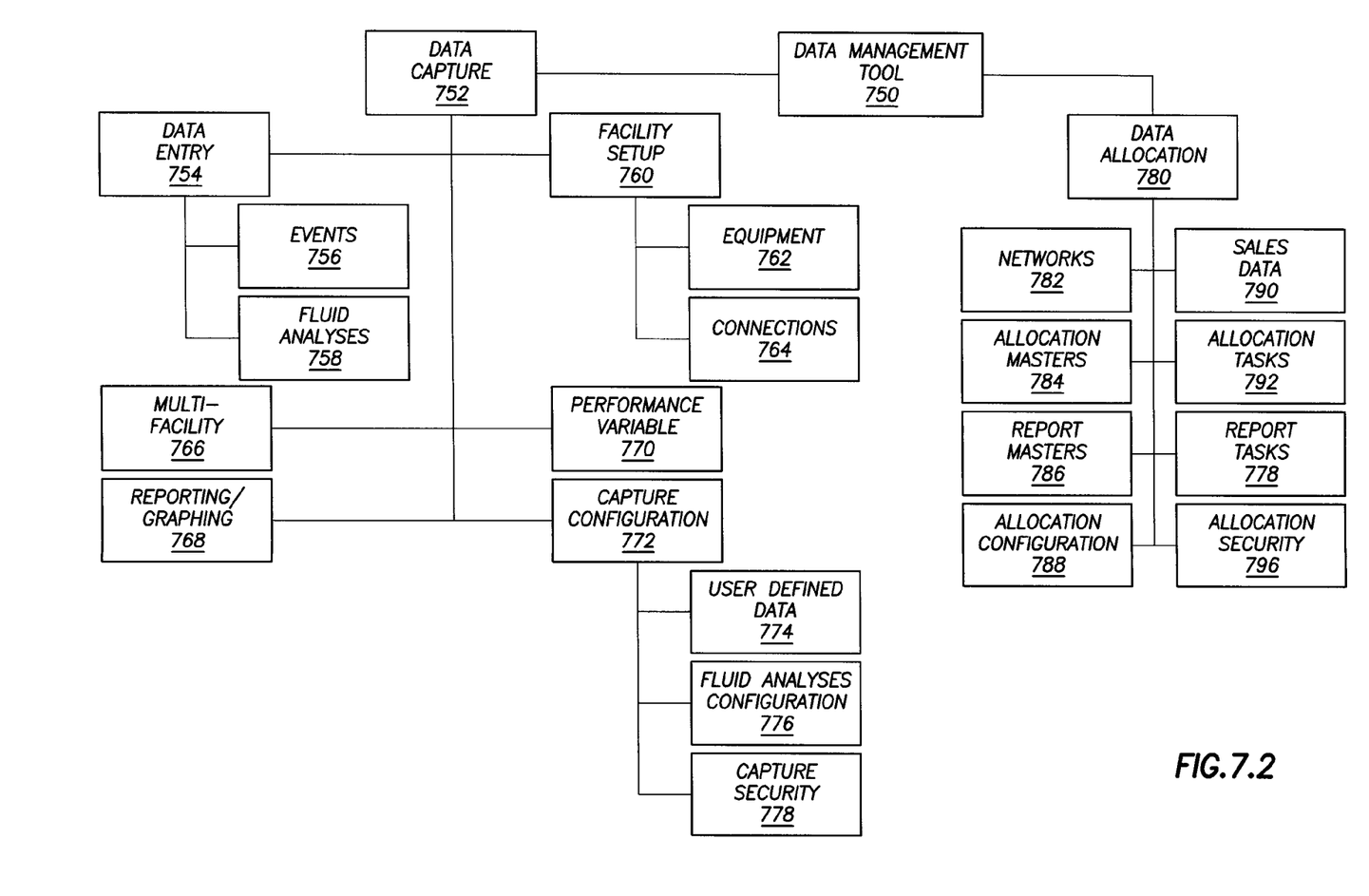

FIG. 7.2 is a schematic view of a data management tool 750 for managing field data. The data management tool 750 may provide substantially the same functionality as the data management tool 602 described in FIG. 6. As shown, the data management tool 750 includes a data capture component 752 and a data allocation component 754.

The data capture component 752 includes a number of components for acquiring field data. As shown, the data capture component 752 includes a data entry component 754, a facility setup component 760, a multi-facility component 766, a performance variable component 770, a reporting/graphing component 768, and a configuration component 772. The data capture component 752 may configure and perform data collection functionality using data acquisition models and data collection procedures as described in FIG. 6.

The data entry component 754 may allow a user to enter data in the system. More specifically, the data entry component 754 may include an events component 756 for defining events at wellsite. Further, the data entry component 754 may include a fluid analyses component 758 for tracking fluid samples collected in the field and any laboratory analyses performed on the collected samples.

The facility setup component 760 may allow a user to define information associated with a facility 760. More specifically, the facility setup component 760 may provide functionality for creating and integrating new facilities into existing data acquisition models. Further, the facility setup component 760 may include an equipment component 762 for creating and integrating equipment into existing data acquisition models. The facility setup 760 may also include a connections module 764 for defining and managing connections between well sites and facilities.

The multi-facility component 766 provides functionality for managing oil, gas, and injection wells simultaneously.

The performance variable component 770 may allow a user to create daily, weekly, monthly, or yearly key performance indicators (KPI) targets for any measurement at any level and use the KPI targets to report production variances.

The capture configuration component 772 may allow a user to configure aspects of the data capture component 752. For instance, the configuration component 772 may include a user defined data component 774 for defining custom calculations. The custom calculations may be attached to a user defined data point and linked into the automatic calculation cycle of a wellsite. In another example, the configuration component 772 may include a fluid analysis configuration component 776 for configuring settings to be used by the fluid analyses component 758. In another example, the configuration component 772 may include a capture security component 778 for defining security settings in the data capture process. More specifically, the capture security component 778 may provide functionality for defining and managing user roles in the data capture process.

The data capture component 780 includes a number of components for allocating production data. As shown, the data allocation component 780 includes a networks component 782, an allocation masters component 784, a report masters component 786, a configuration component 788, a sales data component 790, an allocation tasks component 792, a report tasks component 794, and an allocation security component 772. The data allocation component 752 may configure and perform data allocation procedures as described in FIG. 6.

The network component 782 may provide functionality for defining allocation networks. Further, the network component 782 may allow a user to modify a network using a network visualization tool.

The allocation masters component 784 may allow a user to define allocation masters, which are used to create allocation tasks. Allocation tasks may be performed by the allocation tasks component 792. The allocation task component 792 may also allow adjustments to previously generated results and store the original and adjusted results.

The report masters component 784 may allow a user to define report masters, which are used to create report tasks. Report tasks may be performed by the report tasks component 792.

The allocation configuration component 788 may allow a user to configure aspects of the data allocation component 780.

The sales data component 790 may provide functionality for allocating sales data.

The allocation security component 796 may provide functionality for defining security settings in the data allocation process. More specifically, the allocation security component 796 may provide functionality for defining and managing user roles in the data allocation process.

Figure 8:
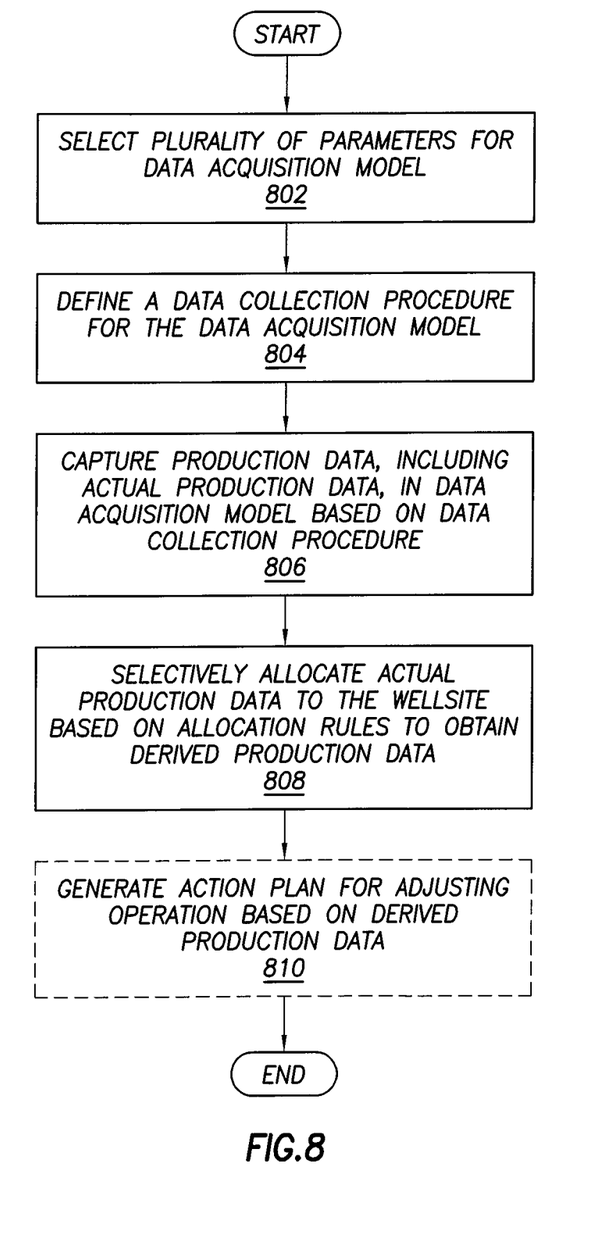
FIGS. 8-9 show flow charts depicting one or more embodiments of methods for performing an operation.

FIG. 8 shows a flow chart depicting a method for allocating production data to a wellsite in one or more embodiments of the invention. The method may be performed using, for instance, the system of FIG. 6. The method may involve selecting a plurality of parameters for a data acquisition model (block 802), defining a data collection procedure for the data acquisition model (block 804), capturing production data in the data acquisition model based on the data collection procedure (block 806), and selectively allocating the production data to the wellsite based on allocation rules to obtain derived production data (block 808), generating an action plan for adjusting an operation based on the derived production data (block 810).

A plurality of parameters may be selected for a data acquisition model (block 802). For instance, a user may select daily measurements (e.g., pressure, temperature, volume, etc.) of a wellsite as parameters for the data acquisition model.

Next, the data collection procedure for the data acquisition model may be defined (block 804). More specifically, a user may specify sources and connections for obtaining the parameters defined in the data acquisition model. For instance, the sources may be server(s) as described in FIG. 6. In another example, production data may be transmitted to the data repository (608 of FIG. 6) via the data interface module (614 of FIG. 6). Further, the user may specify a schedule for automatically obtaining the parameters defined in the data acquisition model.

In some cases, multiple connections associated with the wellsite may be selectively included in the data collection procedure. In this case, each connection may be configured to collect production data associated with a particular component of the wellsite. Further, the user may specify an active connection of the multiple connections for obtaining production data from the wellsite. For instance, the user may be presented with a connection schematic to assist in the selection of the active connection. The user may also specify estimation methods for each of the connections for determining the estimated production of the wellsite associated with the connection.

Continuing with the discussion of FIG. 8, production data may be captured (block 806) from a variety of sources. As discussed with respect to FIGS. 1 and 6, production data may be generated by sensors (S) at the wellsite or from other sources. The production data may be transferred directly to the data management tool (602 of FIG. 6), or transferred to the data management tool via one or more of the server(s) (612 of FIG. 6). The production data is then generally received by the interface module of the data management tool. In some cases, the production data may include actual production data associated with a field.

Next, the production data may be allocated to the wellsite based on allocation rules (block 808). For instance, allocation rules may specify that a field's actual production data should be allocated to a wellsite based on the proportion of the field's estimated production that is associated with the wellsite. In this case, the allocated portion of the actual production data may be referred to as the derived production data of the wellsite.

Next, an action plan may be generated for adjusting operations at one of the wellsites based on the derived production data (block 810). Further, the derived production data may be presented as output to the user. For instance, output showing the distribution of actual production data among a number of wellsites in a field may be displayed and/or stored.

The method in FIG. 8 are depicted in a specific order. However, it will be appreciated that portions of the method may be performed simultaneously or in a different order or sequence.

Figure 9:
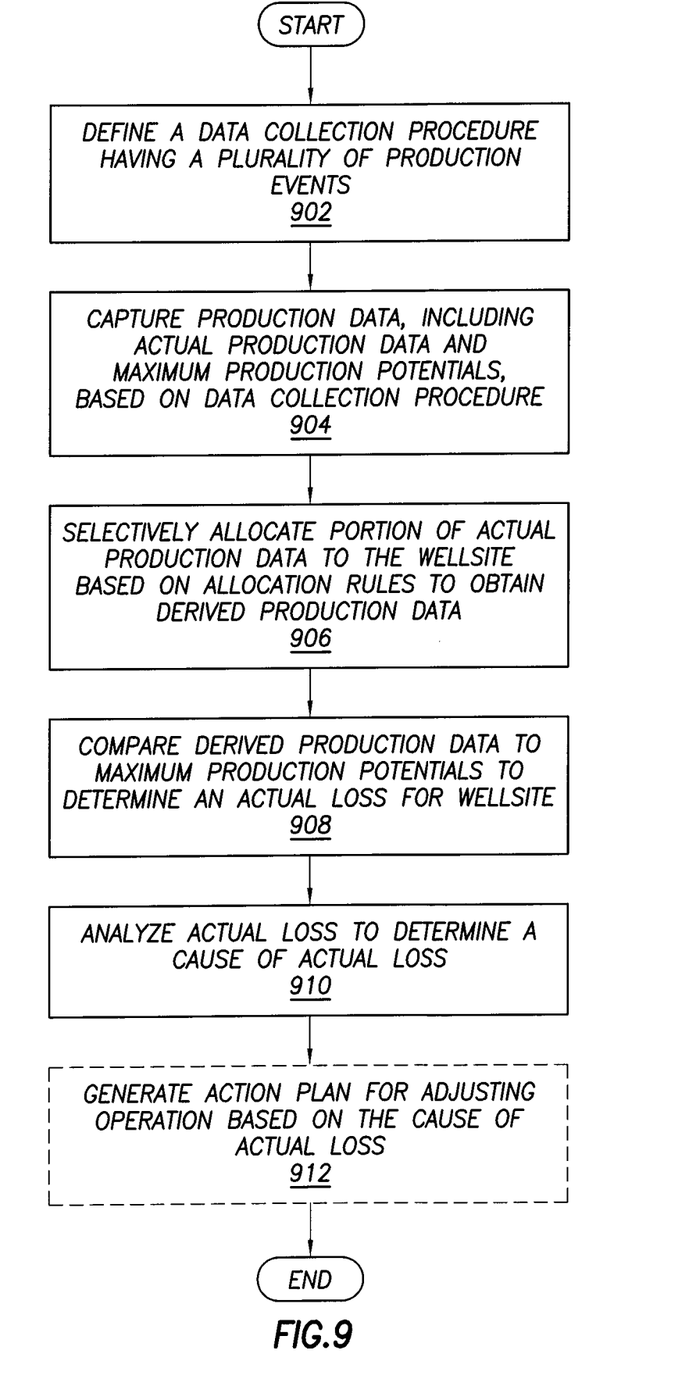

FIG. 9 shows a flow chart depicting a method for loss reconciliation of a wellsite in one or more embodiments. The method may be performed using, for instance, the system of FIG. 6. The method may involve defining a data collection procedure including a plurality of events (block 902), capturing production data based on the data collection procedure (block 904), allocating production data to the wellsite based on allocation rules to obtain derived production data (block 906), comparing derived production data to maximum production potentials to determine an actual production loss (block 908), analyzing the actual production loss to determine a cause of the actual production loss (block 910), and adjusting an operation based on the cause of the actual production loss (block 912).

The data collection procedure for the data acquisition model may be defined (block 902). More specifically, a user may specify sources and connections for obtaining production data. For instance, the sources may be server(s) as described in FIG. 6. In another example, production data may be transmitted to a data repository (608 of FIG. 6) via a data interface module (614 of FIG. 6). Further, the user may specify a schedule for automatically obtaining the production data.

The data collection procedure may include events. The events may be automatically recorded and stored in the server(s) (612 of FIG. 6) during the production period. More specifically, production data associated with an unexpected alteration may be tracked in order to obtain events for a wellsite. In another example, a user may manually enter the events associated with a wellsite using the interface module (603 of FIG. 6). An event may be a significant occurrence in the operation of a field. Examples of significant occurrences include, but are not limited to: changes in the level of production, providing a measurement (e.g., pressure, temperature, volume, etc.), or a confirmed difficulty in the operation of the field (e.g., power outage, force of nature, mechanical failure, etc.).

Continuing with the discussion of FIG. 9, production data may be captured (block 904) from a variety of sources. As discussed with respect to FIGS. 1 and 6, production data may be generated by sensors (S) at the wellsite or from other sources. The production data may be transferred directly to the data management tool (602 of FIG. 6), or transferred to the data management tool via at least one of the server(s) (612 of FIG. 6). The production data is then generally received by the interface module of the data management tool. In some cases, the production data may include actual production data and maximum production potential associated with a field.

In some cases, the maximum production potential may be obtain from an integrated asset model. The integrated asset model may link components (e.g., wellbore, reservoir, gathering facility, processing facility) of a wellsite. For instance, the integrated asset model may model the various components of a wellsite such that choke points (e.g., reservoir, wellbore, surface network, process facility, government regulator, product market, etc.) may be identified at the wellsite. In this example, a wellsite's maximum production potential may be determined based on the choke points identified at the wellsite. More specifically, the maximum production potential may be defined as the production allowed by the lowest choke point. In some cases, the integrated asset module may include simulators as described in FIG. 5. The simulators may be configured to perform simulations using the production data collected by the interface module (603 of FIG. 6).

Next, the production data may be allocated to the wellsite based on allocation rules (block 906). For instance, allocation rules may specify that a field's actual production data should be allocated to a wellsite based on the proportion of the field's estimated production that is associated with the wellsite. In this case, the allocated portion of the actual production data may be referred to as the derived production data of the wellsite.

In some cases, the wellsite's estimated production may be determined based on a performance curve created from well tests and based on measured flowing tubing pressure. In another example, the estimated production may be determined based on actual field measurements. Further, the estimated production of wellsites of a field may be adjusted for other sources (e.g., gas injection, load oil, etc.) and other uses (e.g., flare, lease use, etc.).

The derived production data may be compared to the maximum production potential for a wellsite (block 908). More specifically, an actual production loss for the wellsite may be determined based on the difference between the derived production data and the maximum production potential of the wellsite.

Next, the actual production loss may be analyzed to determine a cause of the actual production loss (block 910). More specifically, the actual production loss may be allocated to events defined in block 902. For instance, the actual production loss associated with a particular event may be calculated as the product of the duration of the event, the production rate of the well or an observed loss prorated based on the maximum production potential, and the flow rate impact percentage of the particular event.

Optionally, the reconciled loss may be overwritten for a measured loss or an estimated loss based on experience or an observation. In this case, based on the maximum production potential, the actual production losses may be prorated for a group of wells impacted by a singular event based on the total loss reconciled to the event.

At this stage, the sum of the actual production loss allocated to the events may be compared to the actual production loss to determine the portion of actual production loss that can be accounted for by the events. If a user determines that the actual production loss is not sufficiently accounted for, a user may manually enter additional events associated with the wellsite. In this case, the actual production loss may be further allocated to the additional events.

Next, an action plan may be generated for adjusting the operation based on the cause of the actual production loss (block 912). In some cases, output showing the distribution of actual production loss among the events of the wellsite may be displayed. The user may use the output to determine cause(s) of the actual production loss for at least one of the events. An engineering analysis based on a variety of factors (e.g., trend, frequency, impact, etc.) may be performed on the cause(s) to determine a root cause of the actual production loss. When a cause is analyzed, the cause may then be stored as historic loss data that can be used in to diagnose wellsites and/or to generate action plans for adjusting an operation. For instance, historic loss data may be used to perform cost-benefit analysis (i.e., comparing reduction in actual production loss to cost of addressing the cause of the actual production loss) in order to generate an action plan that efficiently allocates assets to identified causes of the wellsite.

Those skilled in the art will appreciate that the historic loss data may be visualized in a variety of forms (e.g., pie charts, bar graphs, Pareto charts, etc.) and grouped based on user-defined criteria (e.g., business unit, geographical region, cause of failure, etc.) for analyzing trends associated with a root cause of the actual production loss.

At this stage, when a root cause is identified, a user may generate an action plan based on the root cause. For instance, the user may perform a cost-benefit analysis of potential action plans to determine the actions necessary to implement the action plan. In this example, an opportunity register action is created to link actual production losses to opportunities for performance improvement, where the opportunities are associated with a cost-benefit analysis and implementation actions, allowing the operator to monitor the opportunities and their impact on operations.

The method in FIG. 9 are depicted in a specific order. However, it will be appreciated that portions of the method may be performed simultaneously or in a different order or sequence.

It will be understood from the foregoing description that various modifications and changes may be made in one or more embodiments without departing from its true spirit. For instance, the method may be performed in a different sequence, and the components provided may be integrated or separate.

This description is intended for purposes of illustration only and should not be construed in a limiting sense. The scope of one or more embodiments should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

While improving production by actual loss allocation has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A system for allocating actual production loss of a wellsite, comprising:
    a user interface module configured to capture production data according to a data collection procedure, the production data comprising actual production data and a maximum production potential of the wellsite;
    a data repository configured to store the production data;
    an allocation module configured to selectively allocate at least a portion of the actual production data to the wellsite based on allocation rules to obtain derived production data; and
    a loss reconciliation module configured to: determine the actual production loss based on the derived production data and the maximum production potential, determine a calculated production loss for one of a plurality of production events based on the maximum production potential and attributes of the one of a plurality of production events, and reconcile the actual production loss and the calculated production loss to determine a cause of the actual production loss.

2. The system of claim 1, further comprising:
    an integrated asset tool configured to: determine the maximum production potential of the wellsite based on choke points.

3. The system of claim 1, further comprising:
    an opportunity module configured to: generate an action plan based on the cause of the actual production loss, wherein the action plan is used to improve production of the wellsite and comprises a cost benefit analysis and implementation actions.

4. The system of claim 1, further comprising at least one data acquisition tool configured to:
    obtain the actual production data from the wellsite; and
    transmit the actual production data to the user interface module.

5. The system of claim 1, further comprising a reporting tool configured to generate output based on the actual production loss, wherein the output is displayed in the user interface module.

6. The system of claim 1, wherein the allocation module is further configured to determine an estimated production of the wellsite based on a performance curve and measured flowing tubing pressure, wherein the performance curve is generated from well tests.

7. The system of claim 1, wherein the allocation module is further configured to selectively link components of the wellsite in a simulation environment.

8. The system of claim 7, further comprising:
    an external application for performing operations at the wellsite.

9. The system of claim 1, wherein the loss reconciliation module is further configured to determine the calculated production loss based on a duration of the at least one of the plurality of production events, the derived production data, a flow rate impact proportion of the at least one of the plurality of production events, and an observed loss prorated based on the maximum production potential.

* * * * *